UNITED STATES PATENT OFFICE.

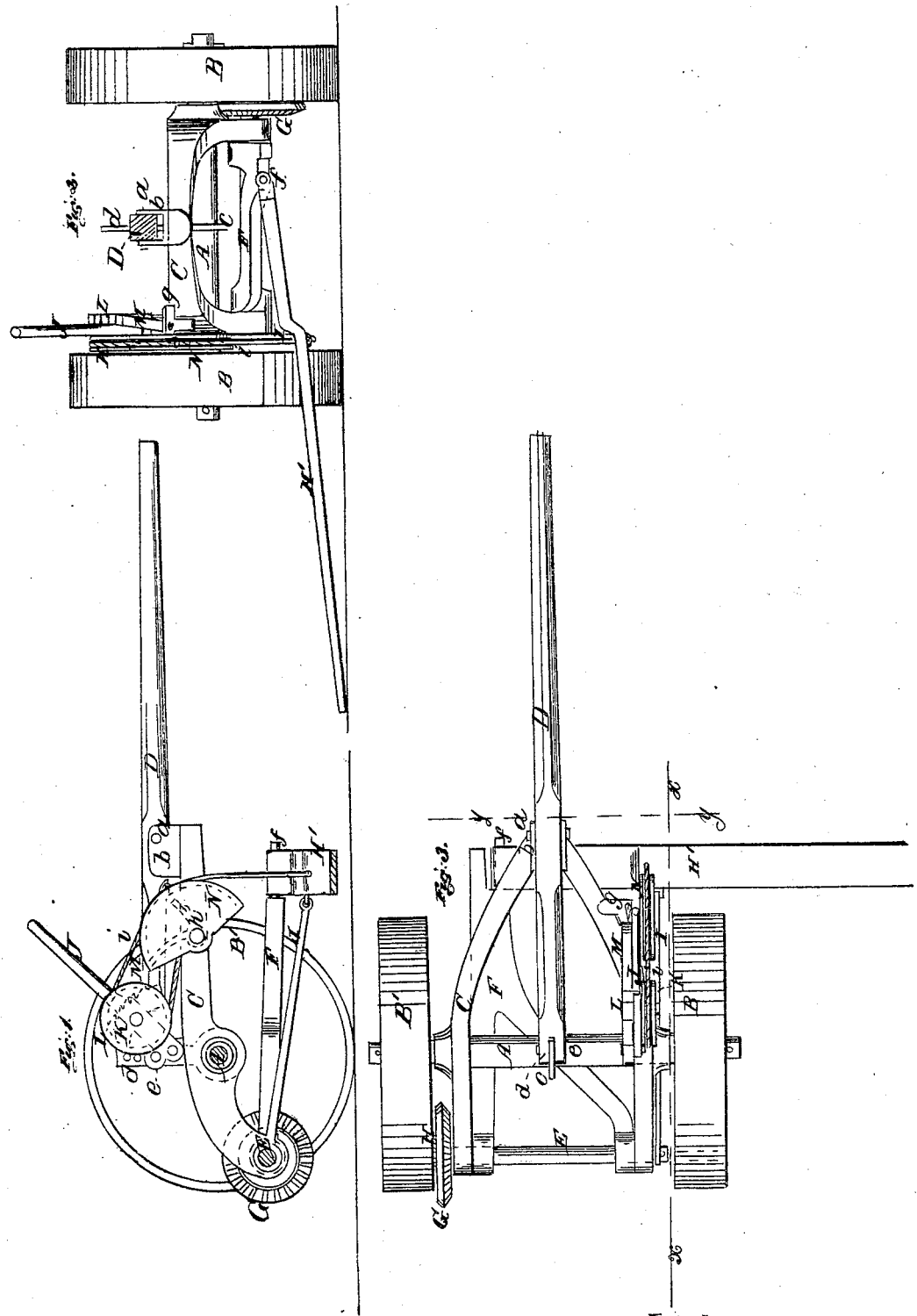

JAMES PINE, OF TROY, NEW YORK, ASSIGNOR TO HIMSELF AND J. J. VIELE, OF SAME PLACE.

IMPROVEMENT IN HARVESTERS.

Specification forming part of Letters Patent No. 33,557, dated October 22, 1861.

*To all whom it may concern:*

Be it known that I, JAMES PINE, of Troy, in the county of Rensselaer and State of New York, have invented certain new and useful Improvements in Grain and Grass Harvesters; and I do hereby declare that the following is a full, clear, and exact description of the same, reference being had to the annexed drawings, making a part of this specification, in which—

Figure 1 is a side sectional view of my invention, taken in the line *x x*, Fig. 2; Fig. 2, a front sectional view of same, taken in the line *y y*, Fig. 1.

Similar letters of reference indicate corresponding parts in the two figures.

This invention consists, first, in an improved manner of hanging the gear-frame; second, in an improved arrangement of devices for securing the finger-bar against horizontal deflection and insuring its freedom of motion in a vertical plane.

To enable those skilled in the art to fully understand and construct my invention, I will proceed to describe it.

A represents an axle, on the ends of which wheels B B' are placed, and C is the main frame of the machine, through which the axle A passes.

D is the draft-pole, which is attached to the front end of the main frame C by a horizontal bolt or pivot, *a*, said bolt or pivot passing through a socket, *b*, in which the draft-pole is fitted, the socket being firmly secured to the main frame.

On the axle *a* there is fitted loosely a band, *c*, to which a bar, *d*, is connected, said bar being perforated and fitted in a slot in the back end of the draft-pole D.

Through the back end of the draft-pole a pin, *e*, passes horizontally, said pin passing through either of the perforations of the bar *d*. By adjusting the pin *e* higher or lower in bar *d* the main frame C may be more or less inclined, and the finger-bar and the front or cutting edge of the sickle, hereinafter referred to, brought nearer to or farther from the surface of the ground, as may be desired.

At the back part of the main frame C there is placed a shaft, E, on which the back part of a gear-frame, F, is fitted loosely and allowed to swing freely.

On the shaft E there is fitted loosely a wheel, G, which wheel has a pinion, H, attached concentrically to it, said pinion gearing or meshing into teeth at the inner side of wheel B'. The gear-frame F may be of V form, its forked or branched back end being fitted on the shaft E, and its front end having the finger-bar H' attached to it by a joint, *f*. On the finger-bar a sickle is placed and driven from the wheel G by any proper means. The finger-bar H' is braced by a rod, I, from shaft E.

To the right-hand side of the main frame C there is attached a lever, J, which lever has a pulley, K, secured to it.

To the lever J there is also attached a ratchet-segment, L, with which a pawl, M, engages. This pawl M is provided with a foot-piece, *g*, which projects from it at the point where its fulcrum-pin *h* passes through it.

On the pin *h* there is placed a half-pulley, N, to the periphery of which a chain or cord, *i*, is attached, said chain or cord passing down and being attached to the finger-bar H'. The chain or cord *i* also passes around the pulley K, and is brought forward and attached to the foot-piece *g* of the pawl M. By this arrangement of the half-pulley N, pulley K, and chain or cord *i*, the finger-bar and sickle may be very readily elevated, not much power being required to effect the result. The pawl M, by engaging with the ratchet-segment L, retains the finger-bar at the desired height, and the pawl may be disengaged from the ratchet-segment at any time by depressing the foot-piece *g*.

By attaching the gear-frame F to the main frame C, as described, and having the wheel G placed loosely on shaft E, and not connected directly with the gear-frame, the latter will not have any downward pressure exerted upon it, as would be the case were the wheel G connected with it. This is an important feature of the invention, for much friction is avoided by the pressing down of the finger-bar on the surface of the ground.

By having the draft-pole D arranged as shown, so that its back may be adjusted higher or lower, the sickle may be made to cut higher or lower, as desired, and by having the finger-bar H attached to the front end of the gear-frame F by a joint, *f*, and the back end of the gear-frame fitted loosely on shaft E, the finger-bar is allowed to conform perfectly to the inequalities of the surface of the ground, while the rod I serves as an efficient brace for the finger-bar.

Having thus described my invention, what I claim as new, and desire to secure by Letters Patent, is—

1. The combination of the gear-frame F and gear-wheel G H, journaled independently upon a shaft, E, secured rigidly in the main frame C in the rear of the axle A.

2. The combination of the finger-bar H', joint $f$, gear-frame F, fixed shaft E, brace-rod I, axle A, and main frame C, constructed, arranged, and operating in the manner and for the purposes herein shown and explained.

JAMES PINE.

Witnesses:
 WM. B. LITCH,
 WILLIAM A. NEWMAN.